United States Patent
Onimaru et al.

(10) Patent No.: US 12,374,214 B2
(45) Date of Patent: Jul. 29, 2025

(54) ROAD MANAGEMENT APPARATUS AND ROAD MANAGEMENT METHOD

(71) Applicant: Honda Motor Co., Ltd., Tokyo (JP)

(72) Inventors: Hiroyuki Onimaru, Tokyo (JP); Takeo Tokunaga, Tokyo (JP); Atsuki Kakinuma, Tokyo (JP); Yasuo Oishi, Tokyo (JP); Akira Iihoshi, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 238 days.

(21) Appl. No.: 18/088,072

(22) Filed: Dec. 23, 2022

(65) Prior Publication Data

US 2023/0206750 A1 Jun. 29, 2023

(30) Foreign Application Priority Data

Dec. 28, 2021 (JP) .................. 2021-213573

(51) Int. Cl.
*G08G 1/01* (2006.01)
*G08G 1/00* (2006.01)
*G08G 1/052* (2006.01)

(52) U.S. Cl.
CPC ......... *G08G 1/0112* (2013.01); *G08G 1/0125* (2013.01); *G08G 1/052* (2013.01); *G08G 1/20* (2013.01)

(58) Field of Classification Search
None
See application file for complete search history.

(56) References Cited

U.S. PATENT DOCUMENTS

| 11,237,007 B2* | 2/2022 | Fowe ................ G06F 16/29 |
| 2007/0208497 A1* | 9/2007 | Downs ................ G08G 1/0104 |
| | | 701/117 |

(Continued)

FOREIGN PATENT DOCUMENTS

| JP | 108106593 A | 4/1996 |
| JP | 3249690 B2 | 1/2002 |

(Continued)

OTHER PUBLICATIONS

Japanese office action; Application 2021-213573;Jul. 4, 2023.

*Primary Examiner* — Justin S Lee
*Assistant Examiner* — Melanie G Huber
(74) *Attorney, Agent, or Firm* — Duft & Bornsen, PC

(57) ABSTRACT

A road management apparatus including a communication unit and a microprocessor. The microprocessor is configured to perform acquiring detection information via the communication unit, the detection information being information from a detection device mounted on each vehicle, and estimating a traveling lane on which each vehicle travels based on the detection information. The memory stores driving information including at least one of vehicle speed information and operation information of a direction indicator in association with the traveling lane, the driving information being obtained from the detection information acquired in each of a first period and a second period earlier than the first period. The microprocessor is configured to further perform estimating an occurrence of an abnormality on a road in the first period, in accordance with a degree of divergence between the driving information in the first period and the second period stored in the memory.

13 Claims, 6 Drawing Sheets

(56) References Cited

U.S. PATENT DOCUMENTS

| | | | | |
|---|---|---|---|---|
| 2011/0160988 A1* | 6/2011 | Rogers | ............ | G08G 1/20 |
| | | | | 701/119 |
| 2013/0282264 A1* | 10/2013 | Bastiaensen | ...... | G08G 1/0145 |
| | | | | 701/119 |
| 2017/0106855 A1* | 4/2017 | Lavoie | ......... | B60W 50/0097 |
| 2021/0027619 A1* | 1/2021 | Yusa | ............ | G08G 1/0133 |
| 2021/0339777 A1* | 11/2021 | Kataoka | ......... | G08G 1/20 |

FOREIGN PATENT DOCUMENTS

| | | |
|---|---|---|
| JP | 2007071579 A | 3/2007 |
| JP | 2013020524 A | 1/2013 |
| JP | 2021068315 A | 4/2021 |

* cited by examiner

ROAD MANAGEMENT APPARATUS AND ROAD MANAGEMENT METHOD

CROSS-REFERENCE TO RELATED APPLICATION

This application is based upon and claims the benefit of priority from Japanese Patent Application No. 2021-213573 filed on Dec. 28, 2021, the content of which is incorporated herein by reference.

BACKGROUND OF THE INVENTION

Field of the Invention

This invention relates to a road management apparatus and a road management method.

Description of the Related Art

In order to manage a road, it is necessary to acquire road information such as an abnormal state of a traffic flow occurring on the road. In this regard, conventionally, there has been known an apparatus in which data from a vehicle detector installed for each section on a road is processed to determine a congestion in each section, and a cause of the congestion is detected. Such an apparatus is described, for example, in Japanese Patent Publication No. 3249690 (JP3249690B2).

However, in the apparatus described in JP3249690B2, the vehicle detector needs to be installed for each section in order to acquire the road information, resulting in an increase in cost.

SUMMARY OF THE INVENTION

An aspect of the present invention is a road management apparatus including: a communication unit that communicates with a plurality of vehicles; and an electronic control unit including a microprocessor and a memory connected to the microprocessor. The microprocessor is configured to perform: acquiring detection information via the communication unit, the detection information being information from a detection device mounted on each of the plurality of vehicles; and estimating a traveling lane on which the each of the plurality of vehicles travels, based on the detection information. The memory is configured to store driving information including at least one of vehicle speed information and operation information of a direction indicator in association with the traveling lane estimated, the driving information being obtained from the detection information acquired in each of a first period and a second period, the second period being earlier than the first period. The microprocessor is configured to further perform estimating an occurrence of an abnormality on a road in the first period, in accordance with a degree of divergence between the driving information in the first period and the driving information in the second period stored in the memory.

Another aspect of the present invention is a road management method including: acquiring detection information from a detection device mounted on each of a plurality of vehicles; estimating a traveling lane on which the each of the plurality of vehicles travels, based on the detection information; storing driving information including at least one of vehicle speed information and operation information of a direction indicator in association with the traveling lane estimated, the driving information being obtained from the detection information acquired in each of a first period and a second period, the second period being earlier than the first period; and estimating an occurrence of an abnormality on a road in the first period, in accordance with a degree of divergence between the driving information in the first period and the driving information in the second period stored.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1A:
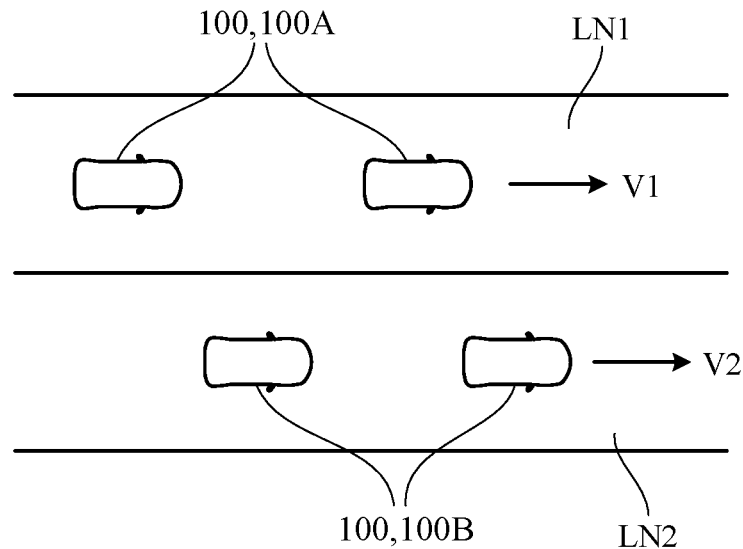
FIG. 1A is a diagram showing an example of a road condition assumed by a road management apparatus according to an embodiment of the present invention.
Figure 1B:
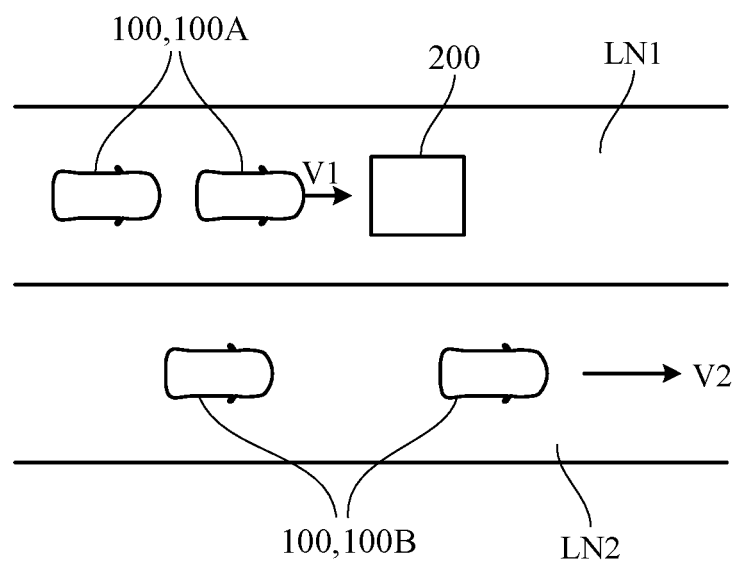
FIG. 1B is a diagram showing another example of the road condition assumed by the road management apparatus according to the embodiment of the present invention.

Hereinafter, an embodiment of the present invention is explained with reference to FIGS. 1A to 6. FIGS. 1A and 1B are diagrams showing examples of road conditions, and diagrams illustrating examples in which a plurality of vehicles 100 travel on a road having a plurality of lanes (for example, two lanes on one side). In FIGS. 1A and 1B, the vehicle 100 traveling in the first lane LN1 is indicated by a reference numeral 100A, and the vehicle 100 traveling in the second lane LN2 is indicated by a reference numeral 100B. The second lane LN2 is located closer to an opposite lane than the first lane LN1. That is, there is an opposite lane on the side of the second lane LN2 (the side opposed to the first lane LN1).

In the example of FIG. 1A, the vehicles 100 travel smoothly without congestion in the first lane LN1 and the second lane LN2. Here, for example, the vehicle speed V1 of the vehicle 100A in the first lane LN1 is slower than the vehicle speed V2 of the vehicle 100B in the second lane LN2, and there is a speed difference between the lanes.

On the other hand, in the example of FIG. 1B, there is an obstacle 200 (such as a falling object) in the first lane LN1, and traffic is congested in the first lane LN1 in order to avoid the obstacle 200. Therefore, the speed difference between the vehicle speed V1 of the vehicle 100A in the first lane LN1 of FIG. 1A and the vehicle speed V1 of the vehicle 100A in the first lane LN1 of FIG. 1B is larger than the speed difference between the vehicle speed V2 of the vehicle 100B in the second lane LN2 of FIG. 1A and the vehicle speed V2 of the vehicle 100B in the second lane LN2 of FIG. 1B. In addition, the speed difference between the lanes in FIG. 1B is larger than the speed difference between the lanes in FIG. 1A.

As described above, the presence or absence of the obstacle 200 on the road is reflected in the speed difference of each lane of the plurality of lanes LN1 and LN2 or the speed difference between the lanes LN1 and LN2, between the normal time point and the time point at which the obstacle exists. In consideration of this point, the present embodiment configures a road management apparatus as follows so that occurrence of an abnormality occurring on a road, such as the presence of an obstacle on the road, can be detected.

Figure 2:
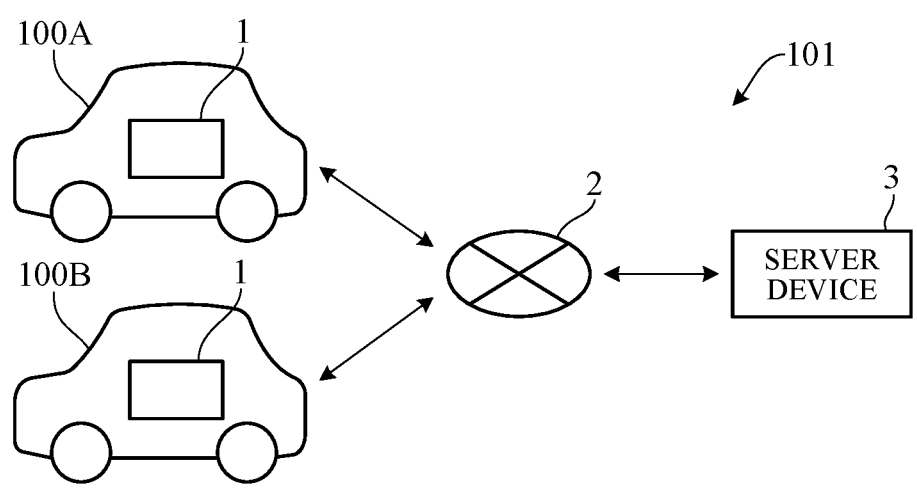
FIG. 2 is a diagram schematically illustrating an overall configuration of a road management system including the road management apparatus according to the embodiment of the present invention.

FIG. 2 is a diagram schematically illustrating an overall configuration of a road management system 101 including a road management apparatus according to an embodiment of the present invention. As illustrated in FIG. 2, the road management system 101 includes an in-vehicle device 1 mounted on each of the plurality of vehicles 100, and a server device 3 provided so as to be able to communicate with the in-vehicle device 1 via the network 2. In FIG. 2, for the sake of convenience, a vehicle 100A traveling in the first lane LN1 and a vehicle 100B traveling in the second lane LN2, i.e., only two vehicles 100, are shown as the plurality of vehicles 100. The configurations of the in-vehicle devices 1 of the respective vehicle 100A and 100B are the same as each other.

The in-vehicle device 1 and the server device 3 are configured to be able to communicate with each other via the network 2. The network 2 includes not only public wireless communication networks, such as Internet networks and cellular phone networks, but also closed communication networks provided for each predetermined management area, such as wireless LAN, Wi-Fi (registered trademark), and Bluetooth (registered trademark). The server device 3 is configured as, for example, a single server or a distributed server including separate servers for each function. The server device 3 may also be configured as a distributed virtual server created in a cloud environment called a cloud server.

Figure 3:
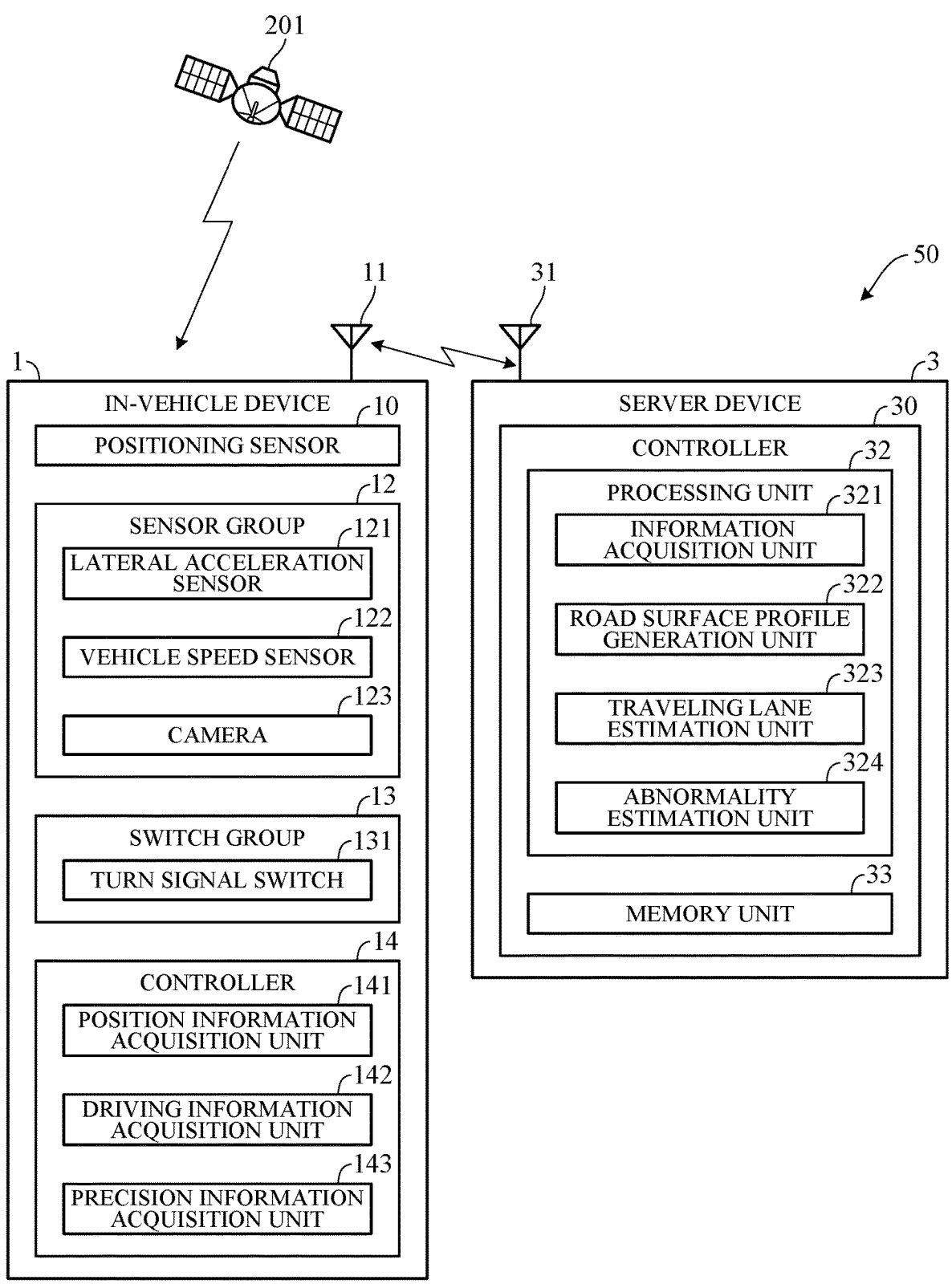
FIG. 3 is a block diagram illustrating a control configuration of the road management apparatus according to the embodiment of the present invention.

FIG. 3 is a block diagram illustrating main control configurations of the in-vehicle device 1 and the server device 3. The road management apparatus 50 according to the present embodiment is mainly configured by the server device 3.

As illustrated in FIG. 3, the in-vehicle device 1 includes a positioning sensor 10 that receives signals for positioning transmitted from a positioning satellite 201, a communication unit 11 that communicates with the server device 3 via the network 2 (FIG. 2), a sensor group 12, a switch group 13, and a controller 14. The positioning satellites 201 is an artificial satellite such as a GPS satellite or quasi-zenith satellite. The current position (latitude, longitude, and altitude) of the vehicles 100 can be calculated using positioning information from the positioning satellite 201 received by the positioning sensors 10.

The sensor group 12 is a generic term for a plurality of sensors that detect a traveling state of the vehicle 100. The sensor group 12 includes a lateral acceleration sensor 121 that detects acceleration of the vehicle 100 in the left-right direction, a vehicle speed sensor 122 that detects vehicle speed, and a camera 123 that is mounted on a front portion of the vehicle 100 and captures an image of the front of the vehicle. The switch group 13 is a generic term of a plurality of switches for detecting the traveling state of the vehicle 100. The switch group 13 includes a turn signal switch 131 that detects an operation of a direction indicator by a driver.

The direction indicator is a device for indicating the direction of the vehicle 100 to the surroundings at the time of the right-left turn or course change of the vehicle 100, and is configured by a turn signal lever or the like.

The controller 14 is configured to include an arithmetic processor having a processing unit such as a CPU, a memory unit such as a ROM, RAM, and other peripheral circuits. The controller 14 functions as a position information acquisition unit 141, a driving information acquisition unit 142, and a precision information acquisition unit 143. The position information acquisition unit 141 acquires the current position information of the vehicle 100 detected by the positioning sensor 10. The driving information acquisition unit 142 acquires driving information of the vehicle 100 including various detection values detected by the sensor group 12 and the switch group 13.

The precision information acquisition unit 143 acquires precision information when the position is measured by the positioning sensor 10. The precision of the positioning is influenced by the arrangement of the positioning satellites 201 in the sky, and can be represented mainly by a DOP (Dilution of Precision). That is, as the dilution of precision increases, the precision of positioning decreases. The information on the dilution of precision can be acquired by the positioning sensor 10, for example. The precision information acquisition unit 143 acquires precision information (information on the dilution of precision) via the positioning sensor 10. The acquired position information, driving information, and precision information are transmitted to the server device 3 via the communication unit 11 constantly.

The server device 3 includes a controller 30 and a communication unit 31. The controller 30 is configured to include an arithmetic processor having a processing unit 32 such as a CPU, a memory unit 33 such as a ROM, RAM, and other peripheral circuits. The processing unit 32 has functions as an information acquisition unit 321, a road surface profile generation unit 322, a traveling lane estimation unit 323, and an abnormality estimation unit 324.

The information acquisition unit 321 acquires the position information and the driving information of the vehicle 100, and the precision information from the in-vehicle device 1 via the communication unit 31. The acquired information is stored in the memory unit 33.

Figure 4:
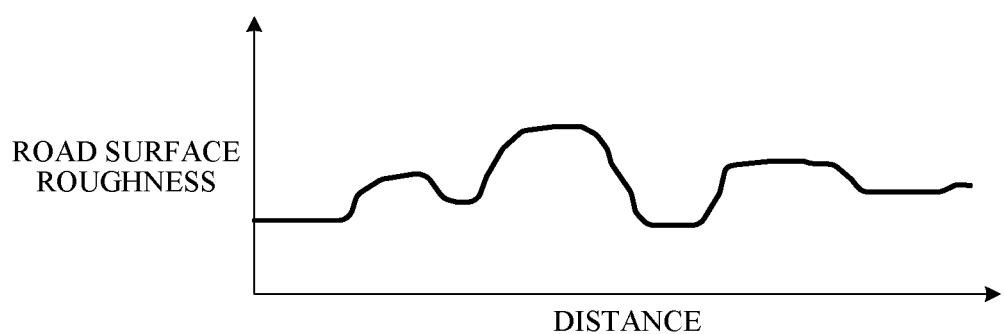
FIG. 4 is a diagram illustrating an example of a road surface profile obtained by the road management apparatus according to the embodiment of the present invention.

The road surface profile generation unit 322 generates a road surface profile indicating a road surface property, based on the position information and the driving information of the vehicles 100 acquired by the information acquisition unit 321. FIG. 4 is a diagram illustrating an example of the road surface profile. In the drawing, the horizontal axis represents the position in the advancing direction of the vehicle 100 along the traveling lane, that is, a distance, and the vertical axis represents an amount (depth or height) of unevenness on the road surface, that is, road surface roughness. In general, as the amount of unevenness on the road surface increases, lateral acceleration of the vehicle 1 increases. Therefore, the road surface property and the lateral acceleration have a predetermined correlation. The road surface profile generation unit 322 calculates the amount of unevenness on the road surface corresponding to the vehicle position on the road from the lateral acceleration detected by the lateral acceleration sensor 121 with such a predetermined correlation, and generates a road surface profile in the advancing direction of the vehicle 100 as illustrated in FIG. 4.

When different vehicles 100 travel in the same lane, the road surface profiles that have been detected by the lateral acceleration sensors 121 of the respective vehicles 100 may be different from each other, because the positions of tires on the road surface are different from each other. In this case, for example, the road surface profile generation unit 322 averages the road surface profiles that have been detected by the lateral acceleration sensors 121 of the respective vehicles 100, and generates a representative road surface profile of each road surface.

The road surface profile generation unit 322 is also capable of generating the road surface profile from data that have been acquired by causing a dedicated vehicle for measuring the road surface property to travel. For example, by causing a dedicated vehicle equipped with a laser profiler to travel and acquiring measurement data at that time together with position data of the dedicated vehicle, it is also possible to generate a road surface profile without use of the lateral acceleration sensor 121.

The memory unit 33 stores the predetermined correlation between the road surface properties and lateral acceleration used when the road surface profile is generated by the road surface profile generation unit 322, and stores road map information. Road map information includes road location information, road shape (curvature or the like) information, road grade information, position information on intersections and branch points, number of lanes, lane widths, and position information for each lane. The position information for each lane includes information on the center position of the lane and the boundaries of the lane position. In addition, the road map information includes information on the road surface profile (FIG. 4) at each location on the road generated by the road surface profile generation unit 322.

The road surface profile information among the road map information pieces stored in the memory unit 33 is updated each time a road surface profile is generated by the road surface profile generation unit 322. The other road map information is updated at predetermined cycles or at arbitrary times.

The traveling lane estimation unit 323 estimates the traveling lane on which the vehicle 100 travels, based on the position information of the vehicle 100, the driving information of the vehicle 100 and the precision information of the positioning which are acquired by the information acquisition unit 321, and the road map information corresponding to the position of the vehicle 100 among the road map information stored in the memory unit 33.

Specifically, first, it is determined whether the precision of positioning is equal to or larger than a predetermined value, in other words, whether the DOP is equal to or smaller than a predetermined value a1. This is a determination of whether it is possible to precisely estimate the lane with use of the position information of the vehicle 100 detected by the positioning sensor 10 in a case where there are a plurality of lanes on the road on which the vehicle 100 is traveling, that is, whether the precision of positioning is maintained enough to be capable of precisely identifying the lane. In order to satisfy such a requirement, the predetermined value al is set beforehand. In a case where it is determined that the DOP is equal to or smaller than the predetermined value al, the traveling lane estimation unit 323 estimates the traveling lane of the vehicle 100, based on the position information detected by the positioning sensor 10 and the lane position included in the road map information.

On the other hand, for example, when it is determined that the precision of positioning is lowered and DOP is larger than the predetermined value al due to the vehicle 100 traveling in a building town or the like surrounded by a large number of high-rise buildings, the traveling lane is estimated, based on a detection value of the lateral acceleration sensor 121 and information of the road surface profile included in the road map information. That is, in this case, since it is difficult to precisely estimate the traveling lane with use of the detection value of the positioning sensor 10, the traveling lane estimated in a case where the DOP is equal to or smaller than the predetermined value al is set as a reference lane, and the current traveling lane is estimated by determining whether a lane change from the reference lane has been made with use of the detection value of the lateral acceleration sensor 121.

Specifically, the amount of unevenness on the road surface is calculated from the lateral acceleration that has been detected by the lateral acceleration sensor 121, with use of the correlation between the road surface property that has been stored beforehand and the lateral acceleration. It is to be noted that when the lateral acceleration is generated in the vehicle 100 while the vehicle 100 is traveling and making a turn or the like, such an amount is corrected, and the amount of unevenness on the road surface is calculated from a detection value of the lateral acceleration sensor 121. Then, a road surface profile representing a change in the amount of unevenness on the road surface along the advancing direction of the vehicle 100, that is, an actually measured road surface profile that is an actually measured value of the road surface profile is compared with a road surface profile for every lane included in the road map information, that is, a reference road surface profile, and whether the lane change from the reference lane has been made is determined. For example, in a case where a coincidence degree representing a similarity between the actually measured road surface profile and the reference road surface profile changes from a state of being equal to or larger than a predetermined value to a state of being smaller than the predetermined value, it is determined that the lane change from the reference lane to an adjacent lane has been made, and the traveling lane is estimated accordingly. It is to be noted that it is possible to calculate the coincidence degree by use of a correlation coefficient or the like.

When determining that the lane change has been made, the traveling lane estimation unit 323 may compare the reference road surface profile with the actually measured road surface profile of each lane, and may estimate the traveling lane in accordance with the coincidence degree. For example, a lane having the largest coincidence degree may be estimated as the current traveling lane.

In a case where it is determined that the DOP is smaller than the predetermined value α1, the traveling lane estimation unit 323 further determines whether a lane change from the reference lane has been made, based on a signal from the turn signal switch 131. That is to say, the direction indicator is normally operated at the time of a lane change, and thus the lane change to the left or right of the vehicle 100 is determined based on the signal from the turn signal switch 131.

In a case where it is determined that the DOP is smaller than the predetermined value α1, the traveling lane estimation unit 323 may estimate the traveling lane based on a signal from the camera 123. That is, when a pair of left and right division lines defining a traveling lane is included in the camera image, a type (another lane, a central separation zone, a sidewalk, or the like) of the one located outside the division line may be determined, and thereby the traveling lane may be estimated. The information on the traveling lane estimated by the traveling lane estimation unit 323 is stored in the memory unit 33 in association with the position information and the driving information of the vehicle 100.

The abnormality estimation unit 324 estimates an occurrence of abnormality on the road, based on the traveling lane of the vehicle 100 estimated by the traveling lane estimation unit 323 and the vehicle speed information included in the driving information of the vehicle 100. In other words, the abnormality estimation unit 324 functions as an abnormality determination unit that determines whether abnormality is occurring on the road. The abnormality on the road denotes a sudden or temporary event that hinders a smooth traffic flow, and includes, for example, the presence of the obstacle 200 on the road as illustrated in FIG. 1B. The occurrence of a traffic jam is also an event different from a normal traffic flow, and is included in the occurrence of abnormality. The occurrence of a chronic traffic jam that is not temporary is not included in the occurrence of abnormality.

The abnormality estimation unit 324 firstly calculates the speed of a vehicle (referred to as a reference vehicle speed) on every traffic lane, when no abnormality is occurring on the road. The reference vehicle speed is a value representing the vehicle speed on every traffic lane within a predetermined period T1 in the past, and is, for example, an average value of the vehicle speeds. Specifically, from among pieces of driving information of the plurality of vehicles 100 within the predetermined period T1 stored in the memory unit 33 beforehand, as illustrated in FIG. 1A, vehicle speed data of the plurality of vehicles 100A, which have traveled in the first lane LN1, are averaged to obtain the reference vehicle speed V1a of the first lane LN1, and in addition, vehicle speed data of the plurality of vehicles 100B, which have traveled in the second lane LN2, are averaged to obtain the reference vehicle speed V2a of the second lane LN2.

The predetermined period T1 is a period necessary for the average value of the vehicle speed data to converge, and is, for example, the past one year. The predetermined period may be longer or shorter than one year. The reference vehicle speeds V1a and V2a for every lane may be obtained from a median value or a most frequent value, instead of the average value of the vehicle speed data. The reference vehicle speeds V1a and V2a correspond to vehicle speeds when no abnormality is occurring on the road.

Next, from among pieces of the driving information of the plurality of vehicles 100 within a latest predetermined period T2 stored beforehand in the memory unit 33, the abnormality estimation unit 324 obtains a vehicle speed V1b, which is a representative value (for example, an average value) of the vehicle speed data in the first lane LN1, and in addition, obtains a vehicle speed V2b, which is a representative value (for example, an average value) of the vehicle speed data in the second lane LN2. The predetermined period T2 is a duration of assumed abnormality on the road, is shorter than the predetermined period T1, and is, for example, the past one week, the past 24 hours, the past one hour, the past 30 minutes, the past 10 minutes, or the like. The vehicle speeds V1b and V2b are respectively to be compared with the reference vehicle speeds V1a and V2a (subject of comparison), and will be hereinafter referred to as subject vehicle speeds.

Furthermore, the abnormality estimation unit 324 calculates a vehicle speed difference ΔV1, which is a difference between the reference vehicle speed V1a in the first lane LN1 and the subject vehicle speed V1b, and a vehicle speed difference ΔV2, which is a difference between the reference vehicle speed V2a in the second lane LN2 and the subject vehicle speed V2b. Then, it is determined whether the magnitudes (absolute values) of the vehicle speed differences ΔV1 and ΔV2 are respectively equal to or larger than predetermined values ΔV1a and ΔV2a. In a case where the magnitudes (absolute values) of the vehicle speed differences ΔV1 and ΔV2 are equal to or larger than the predetermined values ΔV1a and ΔV2a, it is estimated (determined) that the abnormality is occurring. The predetermined values ΔV1a and ΔV2a may be fixed values, or may be variable values respectively corresponding to the reference vehicle speeds V1a and V2a. The predetermined values ΔV1a and ΔV2a may be respectively set, based on the reference vehicle speeds V1a and V2a, such as ±10% of the reference vehicle speeds V1a and V2a.

In addition, the abnormality estimation unit 324 calculates a vehicle speed difference (referred to as a reference vehicle speed difference ΔVa) between the reference vehicle speed V1a in the first lane LN1 and the reference vehicle speed V2a in the second lane LN2, and in addition, calculates a vehicle speed difference (referred to as a subject vehicle speed difference ΔVb) between the subject vehicle speed V1b in the first lane LN1 and the subject vehicle speed V2b in the second lane LN2. Furthermore, the abnormality estimation unit 324 calculates a vehicle speed difference ΔVc (=ΔVa−ΔVb), which is a difference between the reference vehicle speed difference ΔVa and the subject vehicle speed difference ΔVb, and determines whether the magnitude (absolute value) of the vehicle speed difference ΔVc is equal to or larger than a predetermined value ΔVca. Then, in a case where ΔVc|≥ΔVca is satisfied, it is estimated (determined) that the abnormality is occurring. The predetermined value ΔVca may be a fixed value, or may be a variable value corresponding to the reference vehicle speed difference ΔVa.

Figure 5:
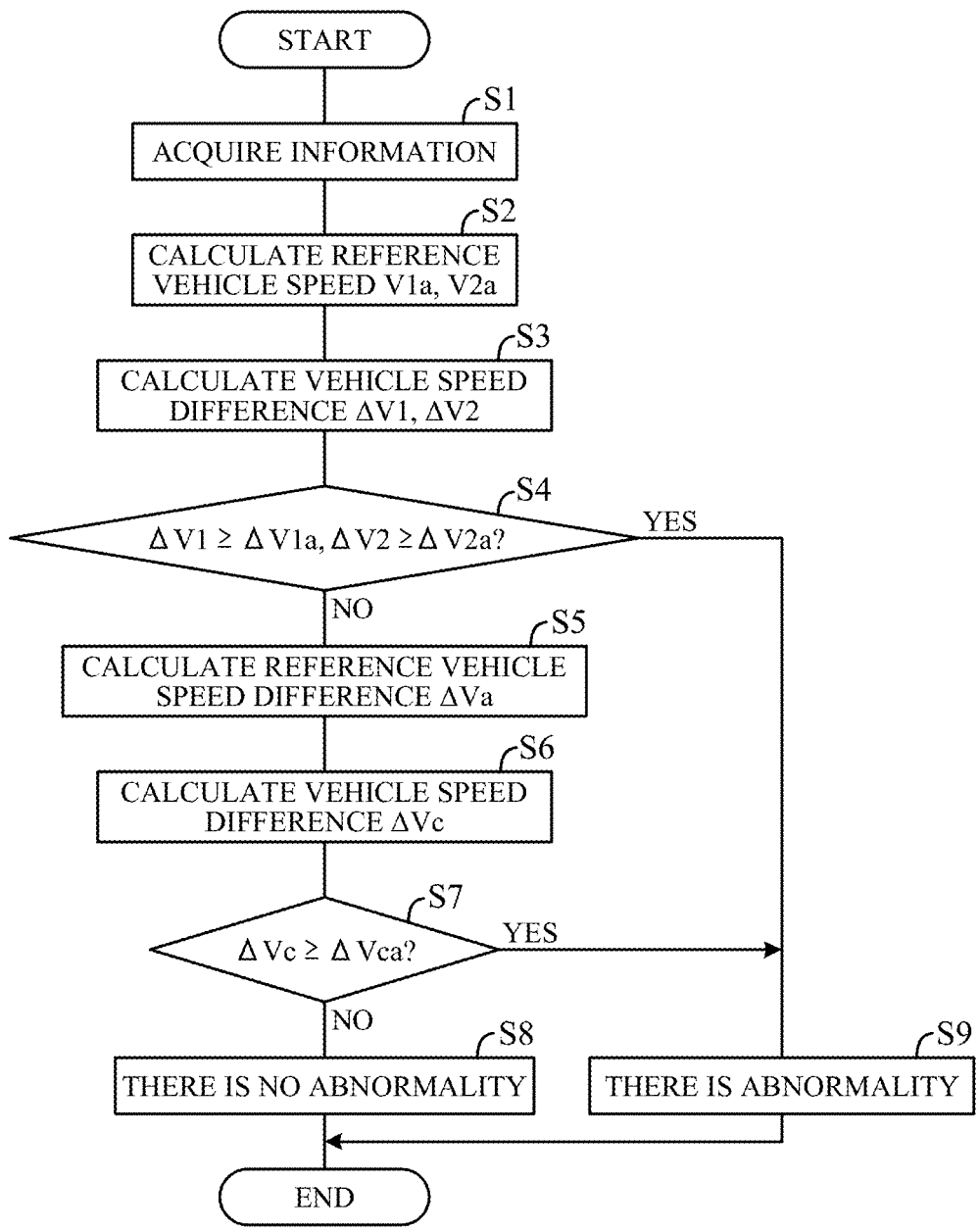
FIG. 5 is a flowchart illustrating an example of processing executed by a controller in FIG. 3.

FIG. 5 is a flowchart illustrating an example of processing executed by the processing unit 32 of the server device 3 of FIG. 4. The processing illustrated in this flowchart is mainly a processing performed by the abnormality estimation unit 324. Therefore, the processing is started in a state in which the traveling lanes LN1 and LN2 of the plurality of vehicles 100 have been estimated by the traveling lane estimation unit 323 in advance, and is repeated at a predetermined cycle.

As illustrated in FIG. 5, first, in S1, current position information and driving information of the vehicle 100 are acquired from the in-vehicle device 1 via the communication unit 31, and past position information and driving information of the vehicle 100 stored in the memory unit 33 are acquired. The driving information also includes information on the traveling lane corresponding to the position information and the driving information. The acquired information is stored in the memory unit 33. Next, in S2, the reference vehicle speeds V1a and V2a obtained by averaging vehicle speed data are calculated based on vehicle speed information included in the acquired driving information within the past predetermined period T1.

Next, in S3, subject vehicle speeds V1b and V2b obtained by averaging the vehicle speed data are calculated based on the vehicle speed information included in the driving information within the latest predetermined period T2, and vehicle speed differences ΔV1 and ΔV2, which are the differences between the reference vehicle speeds V1a and V2a and the subject vehicle speeds V1b and V2b, are calculated. Next, in S4, it is determined whether or not the magnitudes (absolute values) of the vehicle speed differences ΔV1 and ΔV2 are equal to or larger than the predetermined values ΔV1a and ΔV2a.

If it is determined in S4 that ΔV1≥ΔV1a, the processing proceeds to S9, where it is estimated (determined) that there is an abnormality in the first lane LN1, and the processing ends. If it is determined in S4 that ΔV2≥ΔV2a, the processing proceeds to S9, where it is estimated (determined) that there is an abnormality in the second lane LN2, and the processing ends. If it is determined in S4 that $\Delta V1 \geq \Delta V1a$ and $\Delta V2 \, \Delta V2a$ are satisfied, the processing proceeds to S9, where it is estimated (determined) that there are abnormalities in both of the first lane LN1 and the second lane LN2, and the processing ends.

On the other hand, if a negative determination is made in S4, that is, if it is determined that $\Delta V1 < \Delta V1a$ and $\Delta V2 < \Delta V2a$, the processing proceeds to S5. In S5, a reference vehicle speed difference $\Delta Va$ which is a difference between the reference vehicle speed V1a in the first lane LN1 and the reference vehicle speed V2a in the second lane LN2 within the predetermined period T1 is calculated. Next, in S6, a subject vehicle speed difference $\Delta Vb$ which is a difference between the subject vehicle speed V1b in the first lane LN1 and the subject vehicle speed V2b in the second lane LN2 within the predetermined period T2 is calculated, and a vehicle speed difference $\Delta Vc$ which is a difference between the reference vehicle speed difference $\Delta Va$ and the subject vehicle speed difference $\Delta Vb$ is calculated.

Next, in S7, it is determined whether or not the magnitude (absolute value) of the vehicle speed difference $\Delta Vc$ is equal to or larger than the predetermined value $\Delta Vca$. If a positive determination is made in S7, the processing proceeds to S9, where it is estimated that there is an abnormality in the lane having the slower subject vehicle speed V1b or V2b among the first lane LN1 and the second lane LN2, and the processing ends. On the other hand, if a negative determination is made in S7, the processing proceeds to S8, and it is estimated that there is no abnormality on the road, and the processing ends.

In FIG. 5, in a case where there is a speed difference in every lane in the predetermined periods T1 and T2 (S2 to S4), or in a case where there is a speed difference between the lanes in the predetermined periods T1 and T2 (S5 to S7), it is estimated that the abnormality is occurring on the road. In other words, the occurrence of the abnormality is estimated (determined) in a case where the determination is positive in one of S4 and S7. However, when a speed difference occurs in every lane in the predetermined periods T1 and T2 and a speed difference also occurs between the lanes in the predetermined periods T1 and T2, that is, the determination is positive in both S4 and S7, it may be estimated (determined) that the abnormality is occurring on the road.

The operation of the road management apparatus 50 according to the present embodiment will be summarized as follows. As illustrated in FIG. 1A, vehicle speed data for the predetermined period T1 (for example, the past one year) of the plurality of lanes LN1 and LN2 is stored beforehand in the memory unit 33. The reference vehicle speeds V1a and V2a in the respective lanes LN1 and LN2 obtained from the vehicle speed data are constantly compared with the subject vehicle speeds V1b and V2b in the respective lanes obtained from the vehicle speed data in the latest predetermined period T2 (for example, 10 minutes) (S4). Furthermore, the vehicle speed difference (reference vehicle speed difference) $\Delta Va$ between the lanes LN1 and LN2 within the predetermined period T1 and the vehicle speed difference (subject vehicle speed difference) $\Delta Vb$ between the lanes LN1 and LN2 within the predetermined period T2 are constantly compared with each other (S7).

As illustrated in FIG. 1A, in a state of the smooth traffic flow, the differences $\Delta V1$ and $\Delta V2$ between the reference vehicle speeds V1a and V2a and the subject vehicle speeds V1b and V2b are respectively smaller than the predetermined values $\Delta V1a$ and $\Delta V2a$. In addition, the difference $\Delta Vc$ between the reference vehicle speed difference $\Delta Va$ and the subject vehicle speed difference $\Delta Vb$ is also smaller than the predetermined value $\Delta Vca$. In this case, it is determined that the abnormality, such as the presence of an obstacle on the road or the occurrence of a traffic jam, is not occurring (S8).

On the other hand, as illustrated in FIG. 1B, in a case where the obstacle 200 is present in the first lane LN1 on the road, the vehicle speed of the vehicle 100A in the first lane LN1 decreases, and the difference $\Delta V1$ between the reference vehicle speed V1a and the subject vehicle speed V1b becomes equal to or larger than the predetermined value $\Delta V1a$. In addition, the difference $\Delta Vc$ between the reference vehicle speed difference $\Delta Va$ and the subject vehicle speed difference $\Delta Vb$ is also equal to or larger than the predetermined value $\Delta Vca$. Accordingly, it is determined that the abnormality, such as the presence of an obstacle or a traffic jam, is occurring on the road, particularly in the first lane LN1 in which the vehicle speed has decreased (S9). As a result, the server device 3 is capable of outputting information for notifying the presence of the obstacle, the occurrence of the traffic jam, or the like to a road information board or the like installed on the road.

According to the present embodiment, the following operations and effects are achievable.

(1) The road management apparatus 50 includes: the information acquisition unit 321, which acquires position information, travel information, and the like that are information from the sensor group 12 and the switch group 13 respectively mounted on a plurality of vehicles 100 and that are used for estimating a traveling lane in which each of the plurality of vehicles 100 travels; the traveling lane estimation unit 323, which estimates the traveling lane of each of the plurality of vehicles 100, based on the information acquired by the information acquisition unit 321; the memory unit 33, which stores driving information of the vehicle 100 including vehicle speed information obtained from the information acquired by the information acquisition unit 321 in each of the predetermined periods T1 and T2 in association with the traveling lane estimated by the traveling lane estimation unit 323; and the abnormality estimation unit 324, which compares the vehicle speed information in the predetermined period T1 (the reference vehicle speeds V1a and V2a, the reference vehicle speed difference $\Delta Va$) stored in the memory unit 33 with the vehicle speed information in the predetermined period T2 (the subject vehicle speeds V1b and V2b, the subject vehicle speed difference $\Delta Vb$) stored in the memory unit 33, and which estimates an occurrence of abnormality on a road in the predetermined period T2 in accordance with a degree of divergence (FIG. 3).

This eliminates the need for installing a vehicle detector for every section on the road, and the presence or absence of the abnormality on the road can be determined with an inexpensive configuration. In particular, where in the plurality of lanes LN1 and LN2 the abnormality is occurring can be determined easily. In this manner, it becomes possible to estimate the traffic lane in which the abnormality is occurring, so that the roads can be managed appropriately.

(2) The predetermined period T2, from which the subject vehicle speeds V1b and V2b are calculated, is a latest period (for example, the past 10 minutes) from the current time point to a past time point before the predetermined time, and the predetermined period T1, from which the reference vehicle speeds V1a and V2a are calculated, is a past period (for example, the past one year) longer than the predetermined period T2. Accordingly, with reference to the data at the time of normal traveling, the presence or absence of the abnormality on the road at the current time can be determined satisfactorily.

(3) The abnormality estimation unit 324 calculates a representative value (average value) of the vehicle speed information in the predetermined period T1 stored in the memory unit 33, and compares the representative value with the vehicle speed information in the predetermined period T2. This makes it easy to compare the vehicle speed data between the predetermined periods T1 and T2.

(4) The information acquired by the information acquisition unit 321, in particular, the information to be used for lane estimation includes at least one of information from the positioning sensor 10, which receives a signal transmitted from the positioning satellite 201 and measures the location of the vehicle 100, information from the lateral acceleration sensor 121, which detects an acceleration generating in accordance with a road surface profile of a road surface on which the vehicle 100 travels, and information from the camera 123, which images the surroundings of the vehicle 100 (FIG. 3). This makes it possible to accurately estimate the traveling lane of the vehicle 100 without installing a vehicle detector or the like on the road.

(5) The memory unit 33 stores the driving information including the vehicle speed information in each of the predetermined periods T1 and T2 in association with the plurality of traveling lanes LN1 and LN2 estimated by the traveling lane estimation unit 323. The abnormality estimation unit 324 compares the vehicle speed difference (the subject vehicle speed difference; a first speed difference) ΔVb between the plurality of traveling lanes LN1 and LN2 in the predetermined period T2 stored in the memory unit 33 with the vehicle speed difference (the reference vehicle speed difference ΔVa; a second speed difference) between the plurality of traveling lanes LN1 and LN2 in the predetermined period T1, and estimates the occurrence of the abnormality on the road in the predetermined period T2 in accordance with a degree of its divergence (FIG. 5). When a traffic jam occurs on the whole on the road, the speed difference between the plurality of lanes LN1 and LN2 does not become so large. On the other hand, when the abnormality such as the presence of an obstacle (the obstacle 200 in FIG. 1B) in a specific lane (for example, the first lane LN1) occurs, the speed difference between the lanes increases. Therefore, by estimating the occurrence of the abnormality based on the vehicle speed differences ΔVa and ΔVb between the lanes LN1 and LN2, the abnormality occurred in a specific lane can be estimated with accuracy.

Figure 6:
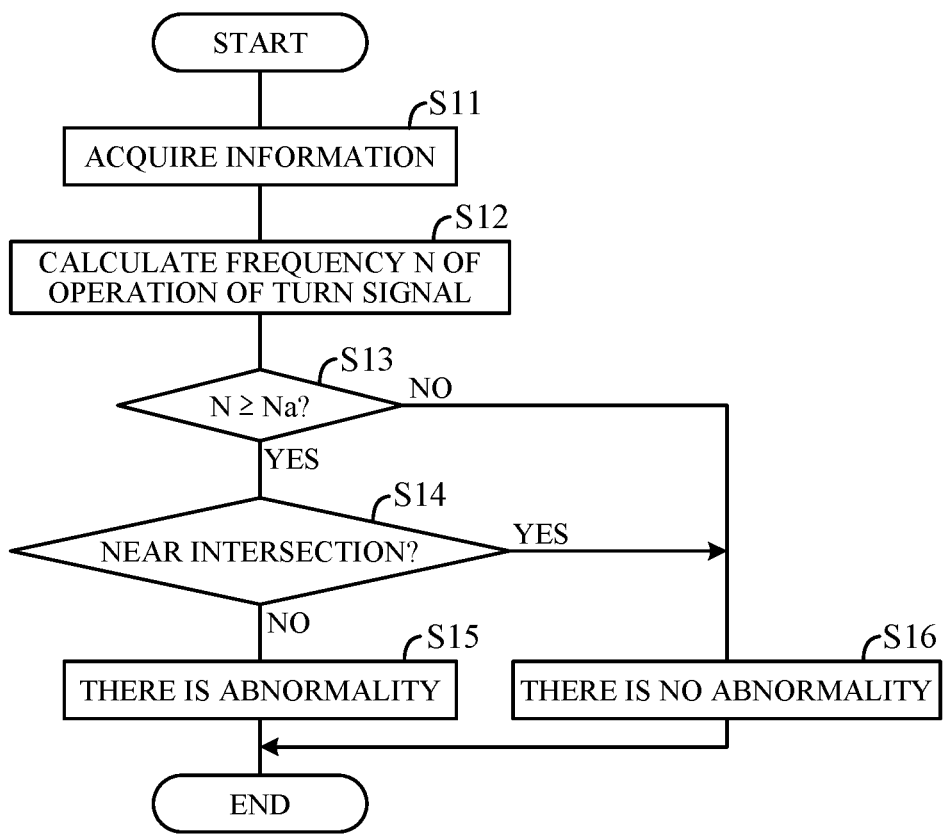
FIG. 6 is a flowchart illustrating another example of processing executed by the controller in FIG. 3.

In the above embodiment, the occurrence of the abnormality on the road is estimated, based on the vehicle speed data. However, when the abnormality occurs on the road, the frequency of lane changes from the lane in which the abnormality has occurred to another one increases. In consideration of this, the occurrence of the abnormality may be estimated, based on the frequency of operating a direction indicator. FIG. 6 is a flowchart illustrating an example of processing in such a case. Similarly to the processing of FIG. 5, the processing of FIG. 6 is also started in a state in which the traveling lanes LN1 and LN2 of the plurality of vehicles 100 have been estimated beforehand by the traveling lane estimation unit 323, and is repeated at a predetermined cycle.

First, in S11, position information and driving information of the vehicle 100 at the current time are acquired from the in-vehicle device 1 via the communication unit 31, and in addition, position information and driving information of the vehicle 100 in the past stored in the memory unit 33 are acquired. The acquired information includes operation information of operating the turn signal switch 131, and is stored in the memory unit 33. Next, in S12, a frequency N of the number of operation times (the number of operation times per unit time) of the turn signal switch 131 within the latest predetermined period T2 is calculated.

Next, in S13, it is determined whether the frequency N of the number of operation times is equal to or larger than a predetermined value Na. The predetermined value Na is a threshold for determining the presence or absence of the abnormality. For example, the predetermined value Na is set to a larger value than the frequency N of the number of operation times during normal traveling in which no abnormality is occurring, that is, the frequency N of the number of operation times within the predetermined period T1. If a positive determination is made in S13, the processing proceeds to S14, and if a negative determination is made, the processing proceeds to S16. In S16, it is estimated that no abnormality is occurring on the road, and the processing ends.

On the other hand, in S14, with reference to the road map information stored beforehand in the memory unit 33, it is determined whether the location of the vehicle 100 where the turn signal switch 131 has been operated is in the vicinity of an intersection. For example, it is determined whether the location of the vehicle 100 falls within a predetermined distance from the intersection. In a case where the location of the vehicle 100 is in the vicinity of the intersection, the frequency N of the number of operation times of the turn signal switch 131 increases, even though there is no abnormality on the road. For this reason, if a positive determination is made in S16, the processing proceeds to S16. On the other hand, in a case where N≥Na is satisfied, even though the location is not in the vicinity of the intersection, the processing proceeds to S15, and it is estimated that the abnormality is occurring on the road, and the processing ends.

In this manner, the abnormality estimation unit 324 estimates an occurrence of the abnormality on the road in the predetermined period T2, based on the operation information of the direction indicator in the predetermined period T2 stored in the memory unit 33. This makes it possible to estimate the occurrence of the abnormality on the road with a simple configuration without installing a vehicle detector. The occurrence of the abnormality may be estimated by using both the operation information of the direction indicator and the vehicle speed information, instead of using either one of the operation information of the direction indicator and the vehicle speed information. For example, in a case where it is estimated from the vehicle speed information that no abnormality is occurring, the occurrence of the abnormality may be estimated based on the operation information of the direction indicator. This makes it possible to more accurately estimate the occurrence of the abnormality on the road.

The above embodiment can be modified in various forms. Hereinafter, a modification will be described. In the above embodiment, the information acquisition unit 321 acquires information (a detection information) from detection devices such as the positioning sensor 10 (a positioning detector), the lateral acceleration sensor 121 (an acceleration detector), the camera 123 (an imaging device), and the turn signal switch 131, and estimates the traveling lane based on the acquired information. However, the traveling lane may be estimated based on information of another detection device. In the above embodiment, the abnormality estimation unit 324 estimates the abnormality on the road based on the vehicle speed information included in the driving information stored in the memory unit 33. However, it may estimate the occurrence of the abnormality on the road based on the vehicle travel information including at least one of lane information and operation information of the direction indicator. Therefore, the configuration of an abnormality estimation unit is not limited to the above configuration.

In the above embodiment, the driving information in the past predetermined period T1 (a second period) and the latest predetermined period T2 (a first period) is stored in the memory unit. In this regard, a relationship between the first period and the second period may be a period in which the second period is earlier than the first period, and may or may not be a period in which the first period and the second period overlap. In the above embodiment, the average value of the vehicle speed data is calculated from the driving information in the predetermined period T1 stored in the memory unit 33 and used as the representative value. However, a representative value of driving information is not limited to this.

In the above embodiment, the road management apparatus 50 is provided in the server device 3. However, some or all of the functions of the road management apparatus 50 may be provided in the in-vehicle device 1. For example, the traveling lane estimation unit 323 may be provided in the in-vehicle device 1, and the server device 3 may acquire information on the traveling lane estimated by the in-vehicle device 1.

The present invention can also be used as a road management method including: acquiring detection information from a detection device such as the positioning sensor 10, the lateral acceleration sensor 121, the camera 123 and the turn signal switch 131, mounted on each of a plurality of vehicles 100; estimating a traveling lane LN1 or LN2 on which the each of the plurality of vehicles 100 travels, based on the detection information; storing driving information including at least one of vehicle speed information and operation information of a direction indicator in association with the traveling lane estimated, the driving information being obtained from the detection information acquired in each of a first period T2 and a second period T1, the second period T1 being earlier than the first period T2; and estimating an occurrence of an abnormality on a road in the first period T2, in accordance with a degree of divergence between the driving information in the first period T2 and the driving information in the second period T1 stored.

The above embodiment can be combined as desired with one or more of the above modifications. The modifications can also be combined with one another.

According to the present invention, a road management apparatus can be configured inexpensively.

Above, while the present invention has been described with reference to the preferred embodiments thereof, it will be understood, by those skilled in the art, that various changes and modifications may be made thereto without departing from the scope of the appended claims.

What is claimed is:

1. A road management apparatus comprising:
a communication unit that communicates with in-vehicle detection devices mounted on a plurality of vehicles over a communication network, the plurality of vehicles including a first group of vehicles traveling on a first traveling lane of a road and a second group of vehicles traveling on a second traveling lane of the road adjacent to the first traveling lane, the second group of vehicles traveling in the same direction as the first group of vehicles; and an electronic control unit including a microprocessor and a memory connected to the microprocessor, wherein
the microprocessor is configured to perform:
acquiring detection information from the in-vehicle detection devices via the communication unit, the detection information comprising at least position information of the vehicles and driving information of the vehicles;
storing the driving information and the position information in the memory, the driving information including vehicle speed information of the first group of vehicles and vehicle speed information of the second group of vehicles, in association with the first traveling lane and the second traveling lane, the driving information and the position information being acquired in each of a first period and a second period, the second period being earlier than the first period;
estimating an occurrence of an abnormality on the road in the first period, in accordance with a degree of divergence between the driving information in the first period and the driving information in the second period stored in the memory; and
outputting information on the occurrence of the abnormality, wherein
the estimating of the occurrence of the abnormality includes calculating a first speed difference defined as a difference between a first vehicle speed acquired from the vehicle speed information of the first group of vehicles in the first period stored in the memory and a second vehicle speed acquired from the vehicle speed information of the second group of vehicles in the first period stored in the memory, calculating a second speed difference defined as a difference between a third vehicle speed acquired from the vehicle speed information of the first group of vehicles in the second period stored in the memory and a fourth vehicle speed acquired from the vehicle speed information of the second group of vehicles in the second period stored in the memory, and estimating the occurrence of the abnormality on the road in the first period in accordance with a degree of divergence between the first speed difference and the second speed difference.

2. The road management apparatus according to claim 1, wherein
the first period is a period from a current time point to a past time point before a predetermined time, and the second period is a past period longer than the first period.

3. The road management apparatus according to claim 1, wherein
the microprocessor is configured to perform
the estimating including calculating a representative value of the driving information in the second period stored in the memory, and estimating the occurrence of the abnormality on the road in the first period in accordance with a degree of divergence between the representative value and the driving information in the first period.

4. The road management apparatus according to claim 3, wherein
the in-vehicle detection devices include vehicle speed sensors, the representative value of the driving information in the second period is an average value of vehicle speeds included in the detection information in the second period, and the representative value of the driving information in the first period is an average value of vehicle speeds included in the detection information in the first period.

5. The road management apparatus according to claim 4, wherein the microprocessor is configured to perform the estimating including estimating the occurrence of the abnormality on the road in the first period when a difference between the average value in the second period and the average value in the first period is larger than or equal to a predetermined value.

6. The road management apparatus according to claim 1, wherein the detection information includes any one of the position information from a positioning detector measuring a position of a vehicle by receiving a signal transmitted from a positioning satellite, information from an acceleration detector detecting an acceleration generating in accordance with a road surface profile of a road surface on which the vehicle travels, and information from an imaging device imaging a surrounding of the vehicle.

7. The road management apparatus according to claim 1, wherein the microprocessor is configured to perform the estimating including further estimating the occurrence of the abnormality on the road in the first period, based on operation information of a direction indicator in the first period stored in the memory.

8. The road management apparatus according to claim 7, wherein the microprocessor is configured to perform the estimating including estimating the occurrence of the abnormality on the road in the first period when a number of operation times of the direction indicator in the first period is larger than or equal to a predetermined value on a condition that locations of the plurality of vehicles are not near an intersection.

9. The road management apparatus according to claim 1, wherein the first vehicle speed and the second vehicle speed correspond to vehicle speeds when no abnormality is present on the road during the second period, and the microprocessor is configured to perform the estimating of the occurrence of the abnormality including estimating the occurrence of the abnormality on the road in the first period when the degree of divergence between the first speed difference and the second speed difference is equal to or larger than a predetermined value.

10. The road management apparatus according to claim 1, wherein the microprocessor is configured to perform the outputting including outputting the information on the occurrence of the abnormality to a road information board installed on the road.

11. The road management apparatus according to claim 1, wherein the in-vehicle detection devices include a lateral acceleration sensor configured to detect an acceleration of a vehicle in a left-right direction, the memory stores information on a road surface profile of the first traveling lane and information on a road surface profile of the second traveling lane in advance, and the microprocessor is configured to further perform estimating the traveling lane on which each of the plurality of vehicles travels, based on the acceleration detected by the lateral acceleration sensor and the information on the road surface profile stored in the memory.

12. A road management method comprising:

acquiring detection information from an in-vehicle detection device mounted on each of a plurality of vehicles over a communication network, the plurality of vehicles including a first group of vehicles traveling on a first traveling lane of a road and a second group of vehicles traveling on a second traveling lane of the road adjacent to the first traveling lane, the second group of vehicles traveling in the same direction as the first group of vehicles, wherein the detection information comprises at least position information of the vehicles and driving information of the vehicles;

storing the driving information and the position information in memory, the driving information including vehicle speed information of the first group of vehicles and vehicle speed information of the second group of vehicles, in association with the first traveling lane and the second traveling lane, the driving information and the position information being acquired in each of a first period and a second period, the second period being earlier than the first period;

estimating an occurrence of an abnormality on the road in the first period, in accordance with a degree of divergence between the driving information in the first period and the driving information in the second period stored in the memory; and outputting information on the occurrence of the abnormality, wherein the estimating of the occurrence of the abnormality includes calculating a first speed difference defined as a difference between a first vehicle speed acquired from the vehicle speed information of the first group of vehicles in the first period stored in the memory and a second vehicle speed acquired from the vehicle speed information of the second group of vehicles in the first period stored in the memory, calculating a second speed difference defined as a difference between a third vehicle speed acquired from the vehicle speed information of the first group of vehicles in the second period stored in the memory and a fourth vehicle speed acquired from the vehicle speed information of the second group of vehicles in the second period stored in the memory, and estimating the occurrence of the abnormality on the road in the first period in accordance with a degree of divergence between the first speed difference and the second speed difference.

13. A road management system comprising:

in-vehicle detection devices mounted on a plurality of vehicles; and a road management apparatus comprising:

a communication unit that communicates with the in-vehicle detection devices over a communication network, the plurality of vehicles including a first group of vehicles traveling on a first traveling lane of a road and a second group of vehicles traveling on a second traveling lane of the road adjacent to the first traveling lane, the second group of vehicles traveling in the same direction as the first group of vehicles; and an electronic control unit including a microprocessor and a memory connected to the microprocessor, wherein the microprocessor is configured to perform:

acquiring detection information from the in-vehicle detection devices via the communication unit, the detection information comprising at least position information of the vehicles and driving information of the vehicles;

storing the driving information and position information in the memory, the driving information including vehicle speed information of the first group of vehicles and vehicle speed information of the second group of vehicles, in association with the first traveling lane and the second traveling lane, the driving information and the position information being acquired in each of a first period and a second period, the second period being earlier than the first period;

estimating an occurrence of an abnormality on the road in the first period, in accordance with a degree of divergence between the driving information in the first period and the driving information in the second period stored in the memory; and outputting information on the occurrence of the abnormality, wherein the estimating of the occurrence of the abnormality includes calculating a first speed difference defined as a difference between a first vehicle speed acquired from the vehicle speed information of the first group of vehicles in the first period stored in the memory and a second vehicle speed acquired from the vehicle speed information of the second group of vehicles in the first period stored in the memory, calculating a second speed difference defined as a difference between a third vehicle speed acquired from the vehicle speed information of the first group of vehicles in the second period stored in the memory and a fourth vehicle speed acquired from the vehicle speed information of the second group of vehicles in the second period stored in the memory, and estimating the occurrence of the abnormality on the road in the first period in accordance with a degree of divergence between the first speed difference and the second speed difference.

* * * * *